US012320957B2

(12) United States Patent
Tsai

(10) Patent No.: US 12,320,957 B2
(45) Date of Patent: Jun. 3, 2025

(54) OPTICAL IMAGING LENS

(71) Applicant: Calin Technology Co., Ltd., Taichung (TW)

(72) Inventor: Po-Nien Tsai, Pingtung County (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 732 days.

(21) Appl. No.: 17/517,779

(22) Filed: Nov. 3, 2021

(65) Prior Publication Data
US 2023/0063978 A1 Mar. 2, 2023

(30) Foreign Application Priority Data
Aug. 19, 2021 (TW) ................. 110130693

(51) Int. Cl.
G02B 13/00 (2006.01)
G02B 9/62 (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/06; G02B 13/04
See application file for complete search history.

(56) References Cited

U.S. PATENT DOCUMENTS

| | | | | |
|---|---|---|---|---|
| 2010/0027136 A1* | 2/2010 | Ohashi | ................... | G02B 13/04 359/753 |
| 2010/0296180 A1 | 11/2010 | Sudoh et al. | | |
| 2011/0043927 A1* | 2/2011 | Sudoh | ................... | G02B 13/18 359/691 |
| 2012/0147485 A1* | 6/2012 | Kubota | ................... | G02B 9/62 359/794 |

(Continued)

FOREIGN PATENT DOCUMENTS

| | | |
|---|---|---|
| CN | 213780520 U | 7/2021 |
| EP | 2 149 808 A2 | 2/2010 |
| JP | 2010-39088 A | 2/2010 |

(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

(Continued)

*Primary Examiner* — Cara E Rakowski
*Assistant Examiner* — Jennifer A Jones
(74) *Attorney, Agent, or Firm* — Birch, Stewart, Kolasch & Birch, LLP

(57) ABSTRACT

An optical imaging lens, in order from an object side to an image side along an optical axis, includes a first optical assembly, a second optical assembly, a third optical assembly, an aperture, a fourth optical assembly, a fifth optical assembly, and a sixth optical assembly, wherein two of the (Continued)

first optical assembly, the second optical assembly, the third optical assembly, the fourth optical assembly, the fifth optical assembly, and the sixth optical assembly are a compound lens formed by adhering at least two lenses, while the others are single lens, thereby achieving the effect of high image quality and low distortion and satisfying the imaging requirement of visible light during the day and infrared light at night.

23 Claims, 12 Drawing Sheets

(56) References Cited

U.S. PATENT DOCUMENTS

2017/0028599 A1  10/2017  Chen et al.
2018/0149834 A1  5/2018  Chiu

FOREIGN PATENT DOCUMENTS

| TW | 201730619 A | | 9/2017 |
| TW | 1751842 B | * | 12/2017 |
| TW | I751842 B | | 1/2022 |

OTHER PUBLICATIONS

Extended European Search Report dated Aug. 1, 2022 for Application No. 21205239.3.
Taiwanese Search Report for Taiwanese Application No. 110130693, dated May 4, 2022, with English translation.

* cited by examiner

OPTICAL IMAGING LENS

BACKGROUND OF THE INVENTION

Technical Field

The present invention generally relates to an optical image capturing system, and more particularly to an optical imaging lens, which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality and low distortion.

The present invention provides an optical imaging lens, in order from an object side to an image side along an optical axis, including a first optical assembly having negative refractive power, a second optical assembly having negative refractive power, a third optical assembly having positive refractive power, an aperture, a fourth optical assembly having positive refractive power, a fifth optical assembly having positive refractive power, and a sixth optical assembly having positive refractive power, wherein two of the first optical assembly, the second optical assembly, the third optical assembly, the fourth optical assembly, the fifth optical assembly, and the sixth optical assembly include a compound lens formed by adhering at least two lenses.

The present invention further provides an optical imaging lens, in order from an object side to an image side along an optical axis, includes a first lens having negative refractive power, a second lens having negative refractive power, a third lens having positive refractive power, an aperture, a fourth lens having positive refractive power, a fifth lens having negative refractive power, a sixth lens having negative refractive power, a seventh lens having positive refractive power, and an eighth lens. An object-side surface of the first lens is a convex surface, and an image-side surface of the first lens is a concave surface. An object-side surface of the second lens is a concave surface, and an image-side surface of the second lens is a convex surface. The eighth lens is a biconvex lens with positive refractive power.

With the aforementioned design, the arrangement of the refractive powers and the conditions of the optical imaging lens of the present invention could achieve the effect of high image quality and low distortion and could also meet the imaging requirement of visible light during the day and infrared light at night.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
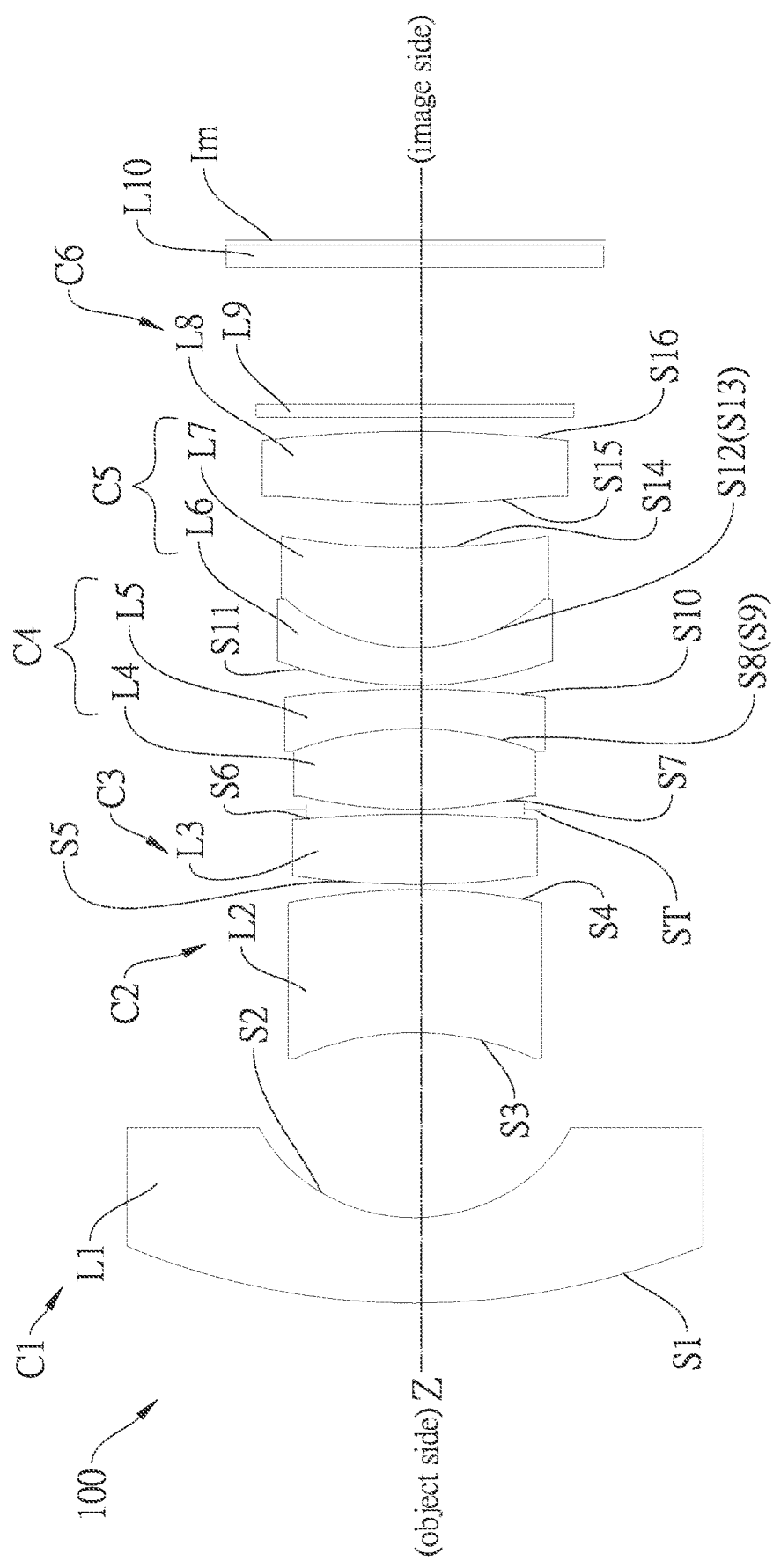
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first optical assembly C1, a second optical assembly C2, a third optical assembly C3, an aperture ST, a fourth optical assembly C4, a fifth optical assembly C5, and a sixth optical assembly C6. In the current embodiment, two of the first optical assembly, the second optical assembly, the third optical assembly, the fourth optical assembly, the fifth optical assembly, and the sixth optical assembly include a compound lens with at least two lenses that are adhered, while the others are single lens.

The first optical assembly C1 has negative refractive power. In the current embodiment, the first optical assembly C1 is a single lens that includes a first lens L1, wherein an object-side surface S1 of the first lens L1 is a convex surface toward the object side, and an image-side surface S2 of the first lens L1 is a concave surface that is arc-shaped. As shown in FIG. 1A, a part of a surface of the first lens L1 toward the image side is recessed to form the image-side surface S2, and the optical axis Z passes through the object-side surface S1 and the image-side surface S2.

The second optical assembly C2 has negative refractive power. In the current embodiment, the second optical assembly C2 is a single lens that includes a second lens L2, wherein the second lens L2 is a negative meniscus. As shown in FIG. 1A, an object-side surface S3 of the second lens L2 is a concave surface that is arc-shaped and recessed toward the image side, and an image-side surface S4 of the second lens L2 is a convex surface toward the image side, and the optical axis Z passes through the object-side surface S3 and the image-side surface S4.

The third optical assembly C3 has positive refractive power. In the current embodiment, the third optical assembly C3 is a single lens that includes a third lens L3, wherein the third lens L3 is a biconvex lens (i.e., both of an object-side surface S5 of the third lens L3 and an image-side surface S6 of the third lens L3 are convex surfaces). As shown in FIG. 1A, the object-side surface S5 of the third lens L3 is convex toward the object side in an arc shape, and the image-side surface S6 of the third lens L3 is slightly convex toward the image side.

The fourth optical assembly C4 has positive refractive power. In the current embodiment, the fourth optical assembly C4 is a compound lens formed by adhering a fourth lens L4 and a fifth lens L5, which could effectively improve a chromatic aberration of the optical imaging lens 100. As shown in FIG. 1A, the fourth lens is a biconvex lens (i.e., both of an object-side surface S7 of the fourth lens L4 and an image-side surface S8 of the fourth lens L4 are convex surfaces) with positive refractive power, wherein the aperture ST is located between the object-side surface S7 of the fourth lens L4 and the image-side surface S6 of the third lens L3, which reduces the stray light and therefore enhances the image quality. The fifth lens L5 is a negative meniscus with negative refractive power, wherein an object-side surface S9 of the fifth lens L5 is a concave surface that is recessed toward the image side in an arc shape, and an image-side surface S10 of the fifth lens L5 is a convex surface toward the image side. The object-side surface S9 of the fifth lens L5 and the image-side surface S8 of the fourth lens L4 are adhered and form a same surface.

The fifth optical assembly C5 has positive refractive power. In the current embodiment, the fifth optical assembly C5 is a compound lens formed by adhering a sixth lens L6 and a seventh lens L7, which could effectively improve a chromatic aberration of the optical imaging lens 100. As shown in FIG. 1A, the sixth lens L6 is a negative meniscus with negative refractive power, wherein an object-side surface S11 of the sixth lens L6 is a convex surface toward the object side in an arc shape, and an image-side surface S12 of the sixth lens L6 is a concave surface that is recessed toward the object side. The seventh lens L7 is a positive meniscus with positive refractive power, wherein an object-side surface S13 of the seventh lens L7 is a convex surface toward the object side in an arc shape, and an image-side surface S14 of the seventh lens L7 is a concave surface that is recessed toward the object side in an arc shape. The object-side surface S13 of the seventh lens L7 and the image-side surface S12 of the sixth lens L6 are adhered and form a same surface.

The sixth optical assembly C6 has positive refractive power. In the current embodiment, the sixth optical assembly C6 is a single lens that includes an eighth lens L8, wherein the eighth lens L8 is a biconvex lens (i.e., both of an object-side surface S15 of the eighth lens L8 and an image-side surface S16 of the eighth lens L8 are convex surfaces), and both of the object-side surface S15 and the image-side surface S16 of the eighth lens L8 are aspheric surfaces.

Additionally, the optical imaging lens 100 further includes an infrared filter L9 and a protective glass L10, wherein the infrared filter L9 is disposed between the eighth lens L8 and the protective glass L10 and is closer to the image-side surface S16 of the eighth lens L8 than the protective glass L10. The protective glass L10 for protecting the infrared filter L9 is disposed between the infrared filter L9 and an image plane Im of the optical imaging lens 100 and is closer to the image plane Im than the infrared filter L9.

In order to keep the optical imaging lens 100 in good optical performance and high imaging quality, the optical imaging lens 100 further satisfies:

(1) $-0.5 > F/f1 > -0.7$;
(2) $-0.15 > F/f2 > -0.3$;
(3) $0.4 > F/f3 > 0.2$;
(4) $0.3 > F/f45 > 0.15$; $0.15 > F/f4 > 0.05$; $-0.01 > F/f5 > -0.03$;
(5) $0.15 > F/f67 > 0.002$; $-0.10 > F/f6 > -0.20$; $0.6 > F/f7 > 0.4$;
(6) $0.3 > F/f8 > 0.15$;

wherein F is a focal length of the optical imaging lens 100; f1 is a focal length of the first lens L1 of the first optical assembly C1; f2 is a focal length of the second lens L2 of the second optical assembly C2; f3 is a focal length of the third lens L3 of the third optical assembly C3; f4 is a focal length of the fourth lens L4 of the fourth optical assembly C4; f5 is a focal length of the fifth lens L5 of the fourth optical assembly C4; f6 is a focal length of the sixth lens L6 of the fifth optical assembly C5; f7 is a focal length of the seventh lens L7 of the fifth optical assembly C5; f8 is a focal length of the eighth lens L8 of the sixth optical assembly C6; f45 is a focal length of the fourth optical assembly C4; f67 is a focal length of the fifth optical assembly C5.

Parameters of the optical imaging lens 100 of the first embodiment of the present invention are listed in following Table 1, including the focal length F of the optical imaging lens 100 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the fourth optical assembly C4, and the focal length (cemented focal length) of the fifth optical assembly C5, wherein a unit of the focal length, the radius of curvature, and the distance is millimeter (mm).

TABLE 1

F = 3.22 mm; Fno = 1.99; HFOV = 129.8 deg

| Surface | R(mm) | D(mm) | Nd | Focal length | Cemented focal length | Note |
|---|---|---|---|---|---|---|
| S1 | 13.46 | 1.86 | 1.88 | −5.51 | | L1 |
| S2 | 4.36 | 4.01 | 1 | | | |
| S3 | −4.26 | 3.11 | 1.91 | −14.79 | | L2 |
| S4 | −11.01 | 0.12 | 1 | | | |
| S5 | 16.09 | 1.53 | 1.95 | 9.55 | | L3 |
| S6 | −21.11 | 0.09 | 1 | | | |
| ST | Infinity | 0.01 | 1 | | | ST |
| S7 | 8.86 | 1.76 | 1.59 | 30.23 | 13.76 | L4 |
| S8, S9 | −6.02 | 0.86 | 1.81 | −134.69 | | L5 |
| S10 | −18.79 | 0.08 | 1 | | | |
| Si1 | 7.88 | 0.83 | 1.95 | −23.23 | 327.11 | L6 |
| S12, S13 | 3.55 | 2.17 | 1.59 | 6.49 | | L7 |
| S14 | 14.14 | 0.94 | 1 | | | |
| S15 | 11.02 | 1.6 | 1.5 | 14.48 | | L8 |
| S16 | −20.92 | 0.3 | 1 | | | |
| S17 | Infinity | 0.3 | 1.52 | | | Infrared filter L9 |
| S18 | Infinity | 2.95 | 1 | | | |
| S19 | Infinity | 0.5 | 1.52 | | | Protective glass L10 |
| S20 | Infinity | 0.1 | 1 | | | |
| Im | Infinity | | | | | Im |

It can be seen from Table 1 that, in the current embodiment, the focal length F of the optical imaging lens 100 is 3.22 mm, and the Fno is 1.99, and the HFOV is 129.8 degrees, wherein f1=−1.51 mm; f2=−14.79 mm; f3=9.55 mm; f4=30.23 mm; f5=−134.69 mm; f6=−23.23 mm; f7=6.49 mm; f8=14.48 mm; f45=13.76 mm; f67=327.11 mm.

Additionally, based on the above detailed parameters, detailed values of the aforementioned conditional formula in the first embodiment are as follows: F/f1=−0.58; F/f2=−0.22; F/f3=0.34; F/f4=0.23; F/f56=0.11; F/f5=−0.02; F/f67=0.01; F/f6=−0.14; F/f7=0.5; F/f8=0.22.

With the aforementioned design, the first optical assembly C1 to the sixth optical assembly C6 satisfy the aforementioned conditions (1) to (6) of the optical imaging lens 100.

Moreover, an aspheric surface contour shape Z of each of the object-side surface S15 of the eighth lens L8, and the image-side surface S16 of the eighth lens L8 of the optical imaging lens 100 according to the first embodiment could be obtained by following formula:

$$Z = \frac{ch^2}{1+\sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; $A_2$, $A_4$, $A_6$, $A_8$, $A_{10}$, $A_{12}$, $A_{14}$, and $A_{16}$ respectively represents different order coefficient of h.

The conic constant k of each of the object-side surface S15 of the eighth lens L8, and the image-side surface S16 of the eighth lens L8 of the optical imaging lens 100 according to the first embodiment and the different order coefficient of $A_2$, $A_4$, $A_6$, $A_8$, $A_{10}$, $A_{12}$, $A_{14}$, and $A_{16}$ are listed in following Table 2:

TABLE 2

| Surface | S15 | S16 |
|---|---|---|
| k | 2.77E+00 | 3.58E+01 |
| A2 | 0 | 0 |
| A4 | −3.55E−03 | 1.20E−03 |
| A6 | 2.06E−04 | −2.63E−04 |
| A8 | −4.11E−05 | 7.48E−05 |
| A10 | 2.81E−06 | −8.53E−06 |
| A12 | −2.39E−08 | 4.33E−07 |
| A14 | 0 | 0 |
| A16 | 0 | 0 |

Figure 1B:
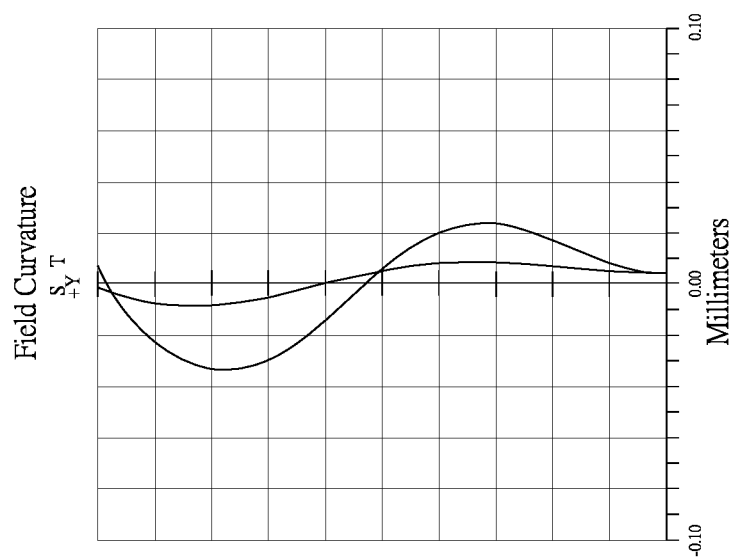
FIG. 1B is a diagram showing the astigmatic field curvature of the optical imaging lens according to the first embodiment of the present invention.
Figure 1C:
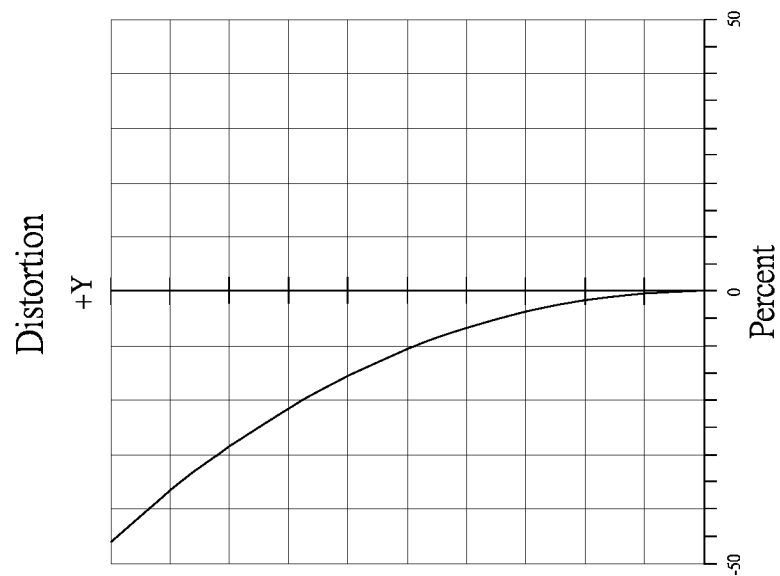
FIG. 1C is a diagram showing the distortion of the optical imaging lens according to the first embodiment of the present invention.
Figure 1D:
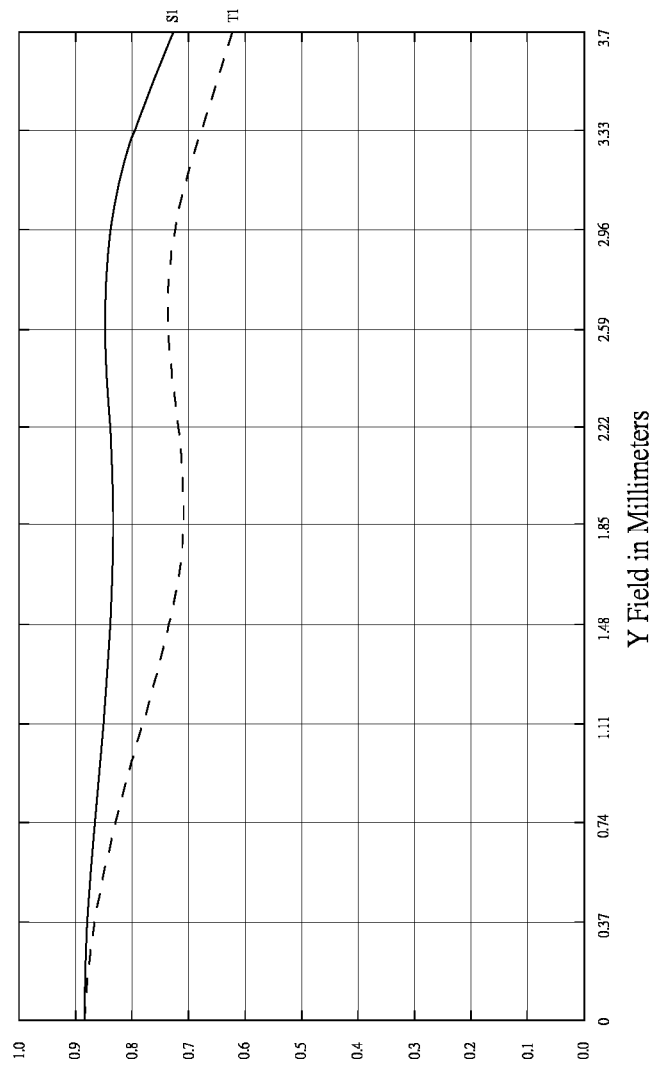
FIG. 1D is a diagram showing the modulus of the OTF of the optical imaging lens according to the first embodiment of the present invention.

Taking optical simulation data to verify the imaging quality of the optical imaging lens 100, wherein FIG. 1B a diagram showing the astigmatic field curves according to the first embodiment; FIG. 1C is a diagram showing the distortion according to the first embodiment; FIG. 1D is a diagram showing the modulus of the OTF according to the first embodiment. In FIG. 1B, a curve S is data of a sagittal direction, and a curve T is data of a tangential direction. The graphics shown in FIG. 1C and FIG. 1D are within a standard range. In this way, the optical imaging lens 100 of the first embodiment could effectively enhance image quality and lower a distortion thereof and could also meet the imaging requirement of visible light during the day and infrared light at night.

Figure 2A:
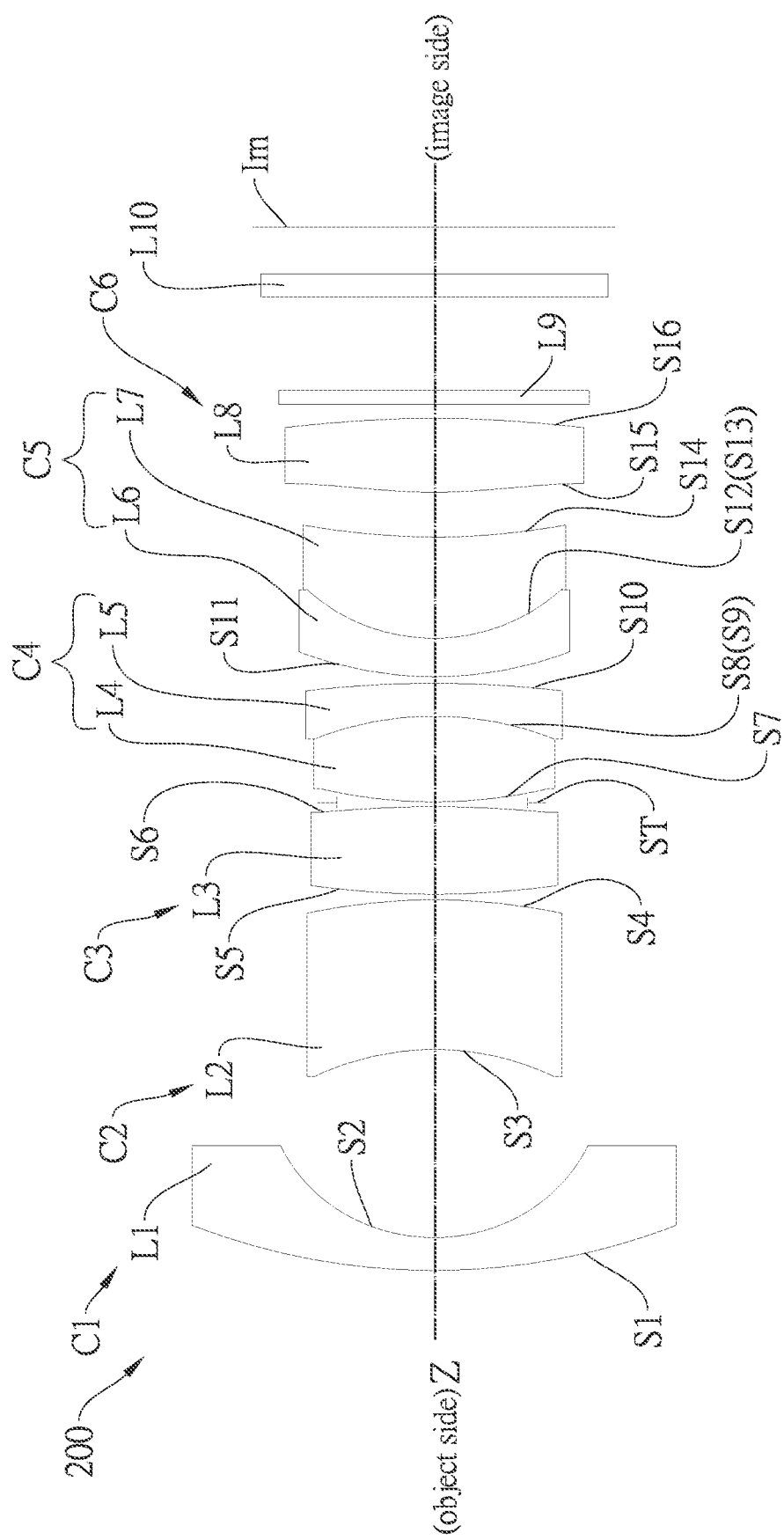
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first optical assembly C1, a second optical assembly C2, a third optical assembly C3, an aperture ST, a fourth optical assembly C4, a fifth optical assembly C5, and a sixth optical assembly C6.

The first optical assembly C1 has negative refractive power. In the current embodiment, the first optical assembly C1 is a single lens that includes a first lens L1, wherein an object-side surface S1 of the first lens L1 is a convex surface toward the object side, and an image-side surface S2 of the first lens L1 is a concave surface that is arc-shaped. As shown in FIG. 2A, a part of a surface of the first lens L1 toward the image side is recessed to form the image-side surface S2, and the optical axis Z passes through the object-side surface S1 and the image-side surface S2.

The second optical assembly C2 has negative refractive power. In the current embodiment, the second optical assembly C2 is a single lens that includes a second lens L2, wherein the second lens L2 is a negative meniscus. As shown in FIG. 2A, an object-side surface S3 of the second lens L2 is a concave surface that is arc-shaped and recessed toward the image side, and an image-side surface S4 of the second lens L2 is a convex surface toward the image side, and the optical axis Z passes through the object-side surface S3 and the image-side surface S4.

The third optical assembly C3 has positive refractive power. In the current embodiment, the third optical assembly C3 is a single lens that includes a third lens L3, wherein the third lens L3 is a biconvex lens (i.e., both of an object-side surface S5 of the third lens L3 and an image-side surface S6 of the third lens L3 are convex surfaces). As shown in FIG. 2A, the object-side surface S5 of the third lens L3 is convex toward the object side in an arc shape, and the image-side surface S6 of the third lens L3 is slightly convex toward the image side.

The fourth optical assembly C4 has positive refractive power. In the current embodiment, the fourth optical assembly C4 is a compound lens formed by adhering a fourth lens L4 and a fifth lens L5, which could effectively improve a chromatic aberration of the optical imaging lens 200. As shown in FIG. 2A, the fourth lens is a biconvex lens (i.e., both of an object-side surface S7 of the fourth lens L4 and an image-side surface S8 of the fourth lens L4 are convex surfaces) with positive refractive power, wherein the aperture ST is located between the object-side surface S7 of the fourth lens L4 and the image-side surface S6 of the third lens L3, which reduces the stray light and therefore enhances the image quality. The fifth lens L5 is a negative meniscus with negative refractive power, wherein an object-side surface S9 of the fifth lens L5 is a concave surface that is recessed toward the image side in an arc shape, and an image-side surface S10 of the fifth lens L5 is a convex surface toward the image side. The object-side surface S9 of the fifth lens L5 and the image-side surface S8 of the fourth lens L4 are adhered and form a same surface.

The fifth optical assembly C5 has positive refractive power. In the current embodiment, the fifth optical assembly C5 is a compound lens formed by adhering a sixth lens L6 and a seventh lens L7, which could effectively improve a chromatic aberration of the optical imaging lens 200. As shown in FIG. 2A, the sixth lens L6 is a negative meniscus with negative refractive power, wherein an object-side surface S1l of the sixth lens L6 is a convex surface toward the object side in an arc shape, and an image-side surface S12 of the sixth lens L6 is a concave surface that is recessed toward the object side in an arc shape. The seventh lens L7 is a positive meniscus with positive refractive power, wherein an object-side surface S13 of the seventh lens L7 is a convex surface toward the object side in an arc shape, and an image-side surface S14 of the seventh lens L7 is a concave surface that is recessed toward the object side in an arc shape. The object-side surface S13 of the seventh lens L7 and the image-side surface S12 of the sixth lens L6 are adhered and form a same surface.

The sixth optical assembly C6 has positive refractive power. In the current embodiment, the sixth optical assembly C6 is a single lens that includes an eighth lens L8, wherein the eighth lens L8 is a biconvex lens (i.e., both of an object-side surface S15 of the eighth lens L8 and an image-side surface S16 of the eighth lens L8 are convex surfaces), and both of the object-side surface S15 and the image-side surface S16 of the eighth lens L8 are aspheric surfaces.

Additionally, the optical imaging lens 200 further includes an infrared filter L9 and a protective glass L10, wherein the infrared filter L9 is disposed between the eighth lens L8 and the protective glass L10 and is closer to the image-side surface S16 of the eighth lens L8 than the protective glass L10. The protective glass L10 for protecting the infrared filter L9 is disposed between the infrared filter L9 and an image plane Im of the optical imaging lens 200 and is closer to the image plane Im than the infrared filter L9.

In order to keep the optical imaging lens 200 in good optical performance and high imaging quality, the optical imaging lens 200 further satisfies:

(1) $-0.5 > F/f1 > -0.7$;
(2) $-0.15 > F/f2 > -0.3$;
(3) $0.4 > F/f3 > 0.2$;
(4) $0.3 > F/f45 > 0.15$; $0.15 > F/f4 > 0.05$; $-0.01 > F/f5 > -0.03$;
(5) $0.15 > F/f67 > 0.002$; $-0.10 > F/f6 > -0.20$; $0.6 > F/f7 > 0.4$;
(6) $0.3 > F/f8 > 0.15$;

wherein F is a focal length of the optical imaging lens 200; f1 is a focal length of the first lens L1 of the first optical assembly C1; f2 is a focal length of the second lens L2 of the second optical assembly C2; f3 is a focal length of the third lens L3 of the third optical assembly C3; f4 is a focal length of the fourth lens L4 of the fourth optical assembly C4; f5 is a focal length of the fifth lens L5 of the fourth optical assembly C4; f6 is a focal length of the sixth lens L6 of the fifth optical assembly C5; f7 is a focal length of the seventh lens L7 of the fifth optical assembly C5; f8 is a focal length of the eighth lens L8 of the sixth optical assembly C6; f45 is a focal length of the fourth optical assembly C4; f67 is a focal length of the fifth optical assembly C5.

Parameters of the optical imaging lens 200 of the second embodiment of the present invention are listed in following Table 3, including the focal length F of the optical imaging lens 200 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the fourth optical assembly C4, and the focal length (cemented focal length) of the fifth optical assembly C5, wherein a unit of the focal length, the radius of curvature, and the distance is millimeter (mm).

TABLE 3

F = 3.01 mm; Fno = 1.99; HFOV = 137.6 deg

| Surface | R(mm) | D(mm) | Nd | Focal length | Cemented focal length | Note |
|---|---|---|---|---|---|---|
| S1 | 13.34 | 0.7 | 1.88 | −5.29 | | L1 |
| S2 | 3.31 | 4.02 | 1 | | | |

TABLE 3-continued

F = 3.01 mm; Fno = 1.99; HFOV = 137.6 deg

| Surface | R(mm) | D(mm) | Nd | Focal length | Cemented focal length | Note |
|---|---|---|---|---|---|---|
| S3 | −4.1 | 3.21 | 1.91 | −14.32 | | L2 |
| S4 | −11.85 | 0.11 | 1 | | | |
| S5 | 15.27 | 1.87 | 1.95 | 9.61 | | L3 |
| S6 | −20.79 | 0.09 | 1 | | | |
| ST | Infinity | 0.01 | 1 | | | ST |
| S7 | 8.87 | 1.84 | 1.59 | 30.39 | 13.94 | L4 |
| S8, S9 | −4.99 | 0.7 | 1.81 | −159.76 | | L5 |
| S10 | −20.14 | 0.14 | 1 | 0 | | |
| S11 | 7.84 | 0.82 | 1.95 | −23.05 | 251.53 | L6 |
| S12, S13 | 4.54 | 2.16 | 1.59 | 6.5 | | L7 |
| S14 | 14.32 | 0.96 | 1 | | | |
| S15 | 11.95 | 1.57 | 1.5 | 14.41 | | L8 |
| S16 | −20.89 | 0.3 | 1 | | | |
| S17 | Infinity | 0.3 | 1.52 | | | Infrared filter L9 |
| S18 | Infinity | 1.99 | 1 | | | |
| S19 | Infinity | 0.5 | 1.52 | | | Protective glass L10 |
| S20 | Infinity | 1 | 1 | | | |
| Im | Infinity | | 1 | | | Im |

It can be seen from Table 3 that, in the second embodiment, the focal length (F) of the optical imaging lens 200 is 3.01 mm, and the Fno is 1.99, and the HFOV is 137.6 degrees, wherein f1=−5.29 mm; f2=−14.32 mm; f3=9.61 mm; f4=30.39 mm; f5=−159.76 mm; f6=−23.05 mm; f7=6.5 mm; f8=14.41 mm; f45=13.94 mm; f67=251.53 mm.

Additionally, based on the above detailed parameters, detailed values of the aforementioned conditional formula in the second embodiment are as follows: F/f1=−0.57; F/f2=−0.21; F/f3=0.31; F/f45=0.22; F/f4=0.1; F/f5=−0.02; F/f67=0.01; F/f6=−0.13; F/f7=0.46; F/f8=0.21.

With the aforementioned design, the first optical assembly C1 to the sixth optical assembly C6 satisfy the aforementioned conditions (1) to (6) of the optical imaging lens 200.

Moreover, an aspheric surface contour shape Z of each of the object-side surface S15 of the eighth lens L8, and the image-side surface S16 of the eighth lens L8 of the optical imaging lens 200 according to the second embodiment could be obtained by following formula:

$$Z = \frac{ch^2}{1 + \sqrt{1 - (1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S15 of the eighth lens L8, and the image-side surface S16 of the eighth lens L8 of the optical imaging lens 200 according to the second embodiment and the different order coefficient of A2, A4, A6, A8, A10, A12, A14, and A16 are listed in following Table 4:

TABLE 4

| Surface | S15 | S16 |
|---|---|---|
| k | 2.85E+00 | 3.57E+01 |
| A2 | 0 | 0 |

TABLE 4-continued

| Surface | S15 | S16 |
|---|---|---|
| A4 | −3.55E−03 | 1.20E−03 |
| A6 | 2.08E−04 | −2.63E−04 |
| A8 | −4.09E−05 | 7.45E−05 |
| A10 | 2.81E−06 | −8.53E−06 |
| A12 | −2.78E−08 | 4.33E−07 |
| A14 | 0 | 0 |
| A16 | 0 | 0 |

Figure 2B:
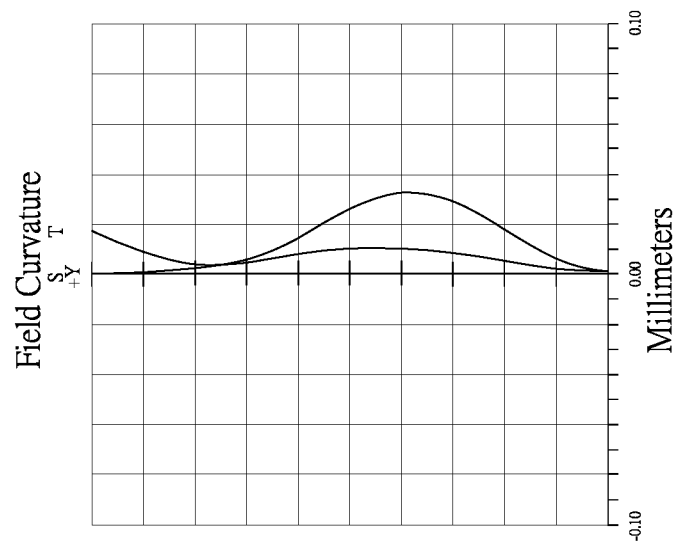
FIG. 2B is a diagram showing the astigmatic field curvature of the optical imaging lens according to the second embodiment of the present invention.
Figure 2C:
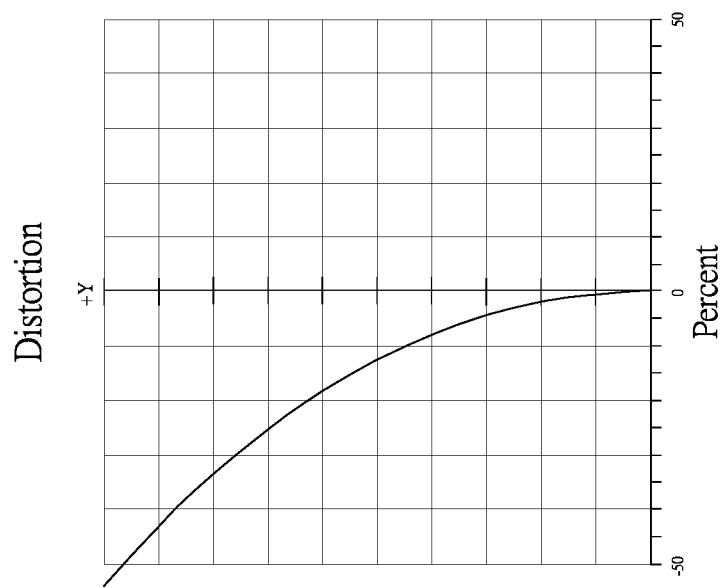
FIG. 2C is a diagram showing the distortion of the optical imaging lens according to the second embodiment of the present invention.
Figure 2D:
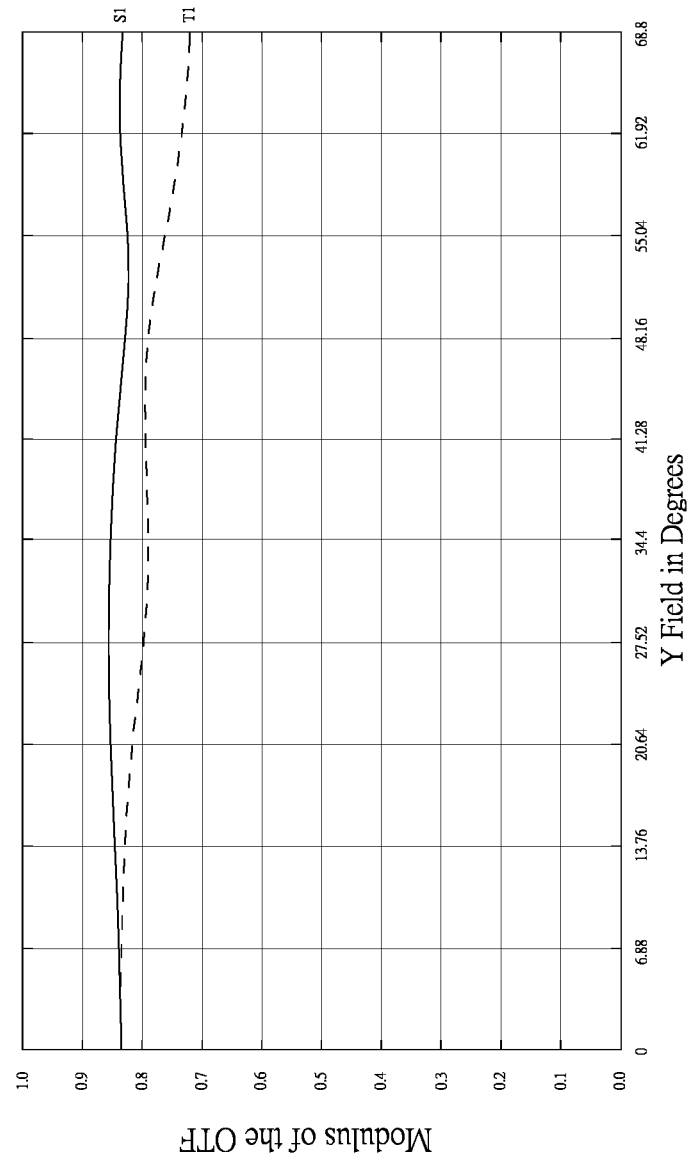
FIG. 2D is a diagram showing the modulus of the OTF of the optical imaging lens according to the second embodiment of the present invention.

Taking optical simulation data to verify the imaging quality of the optical imaging lens 200, wherein FIG. 2B a diagram showing the astigmatic field curves according to the second embodiment; FIG. 2C is a diagram showing the distortion according to the second embodiment; FIG. 2D is a diagram showing the modulus of the OTF according to the second embodiment. In FIG. 2B, a curve S is data of a sagittal direction, and a curve T is data of a tangential direction. The graphics shown in FIG. 2C and FIG. 2D are within a standard range. In this way, the optical imaging lens 200 of the second embodiment could effectively enhance image quality and lower a distortion thereof and could also meet the imaging requirement of visible light during the day and infrared light at night.

Figure 3A:
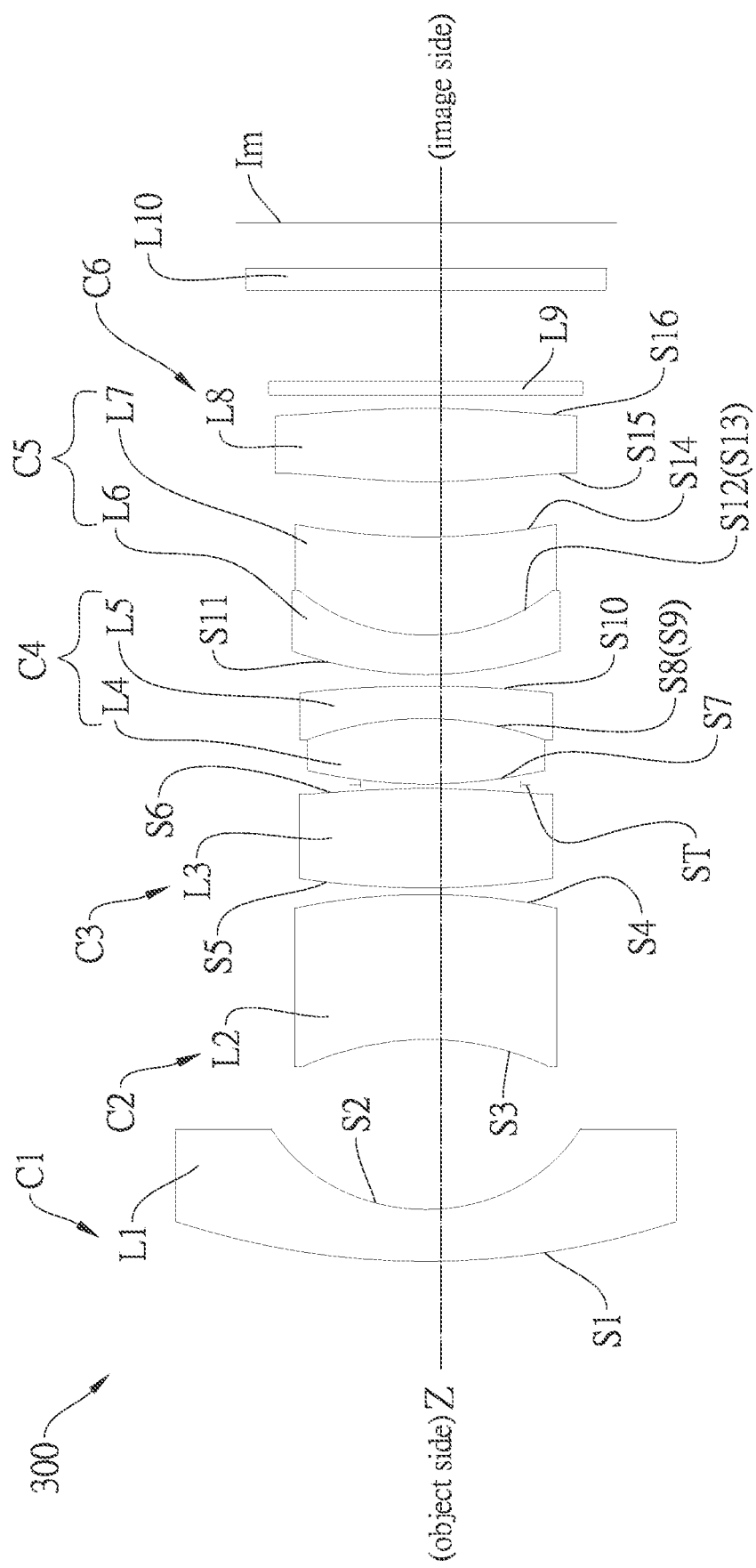
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first optical assembly C1, a second optical assembly C2, a third optical assembly C3, an aperture ST, a fourth optical assembly C4, a fifth optical assembly C5, and a sixth optical assembly C6.

The first optical assembly C1 has negative refractive power. In the current embodiment, the first optical assembly C1 is a single lens that includes a first lens L1, wherein an object-side surface S1 of the first lens L1 is a convex surface toward the object side, and an image-side surface S2 of the first lens L1 is a concave surface that is arc-shaped. As shown in FIG. 3A, a part of a surface of the first lens L1 toward the image side is recessed to form the image-side surface S2, and the optical axis Z passes through the object-side surface S1 and the image-side surface S2.

The second optical assembly C2 has negative refractive power. In the current embodiment, the second optical assembly C2 is a single lens that includes a second lens L2, wherein the second lens L2 is a negative meniscus. As shown in FIG. 3A, an object-side surface S3 of the second lens L2 is a concave surface that is arc-shaped and recessed toward the image side, and an image-side surface S4 of the second lens L2 is a convex surface toward the image side, and the optical axis Z passes through the object-side surface S3 and the image-side surface S4.

The third optical assembly C3 has positive refractive power. In the current embodiment, the third optical assembly C3 is a single lens that includes a third lens L3, wherein the third lens L3 is a biconvex lens (i.e., both of an object-side surface S5 of the third lens L3 and an image-side surface S6 of the third lens L3 are convex surfaces). As shown in FIG. 3A, the object-side surface S5 of the third lens L3 is convex toward the object side in an arc shape, and the image-side surface S6 of the third lens L3 is slightly convex toward the image side.

The fourth optical assembly C4 has positive refractive power. In the current embodiment, the fourth optical assembly C4 is a compound lens formed by adhering a fourth lens L4 and a fifth lens L5, which could effectively improve a chromatic aberration of the optical imaging lens 300. As shown in FIG. 3A, the fourth lens L4 is a biconvex lens (i.e., both of an object-side surface S7 of the fourth lens L4 and an image-side surface S8 of the fourth lens L4 are convex surfaces) with positive refractive power, wherein the aperture ST is located between the object-side surface S7 of the fourth lens L4 and the image-side surface S6 of the third lens L3, which reduces the stray light and therefore enhances the image quality. The fifth lens L5 is a negative meniscus with negative refractive power, wherein an object-side surface S9 of the fifth lens L5 is a concave surface that is recessed toward the image side in an arc shape, and an image-side surface S10 of the fifth lens L5 is a convex surface toward the image side. The object-side surface S9 of the fifth lens L5 and the image-side surface S8 of the fourth lens L4 are adhered and form a same surface.

The fifth optical assembly C5 has positive refractive power. In the current embodiment, the fifth optical assembly C5 is a compound lens formed by adhering a sixth lens L6 and a seventh lens L7, which could effectively improve a chromatic aberration of the optical imaging lens 300. As shown in FIG. 3A, the sixth lens L6 is a negative meniscus with negative refractive power, wherein an object-side surface S11 of the sixth lens L6 is a convex surface toward the object side in an arc shape, and an image-side surface S12 of the sixth lens L6 is a concave surface that is recessed toward the object side. The seventh lens L7 is a positive meniscus with positive refractive power, wherein an object-side surface S13 of the seventh lens L7 is a convex surface toward the object side in an arc shape, and an image-side surface S14 of the seventh lens L7 is a concave surface that is recessed toward the object side in an arc shape. The object-side surface S13 of the seventh lens L7 and the image-side surface S12 of the sixth lens L6 are adhered and form a same surface.

The sixth optical assembly C6 has positive refractive power. In the current embodiment, the sixth optical assembly C6 is a single lens that includes an eighth lens L8, wherein the eighth lens L8 is a biconvex lens (i.e., both of an object-side surface S15 of the eighth lens L8 and an image-side surface S16 of the eighth lens L8 are convex surfaces), and both of the object-side surface S15 and the image-side surface S16 of the eighth lens L8 are aspheric surfaces.

Additionally, the optical imaging lens 300 further includes an infrared filter L9 and a protective glass L10, wherein the infrared filter L9 is disposed between the eighth lens L8 and the protective glass L10 and is closer to the image-side surface S16 of the eighth lens L8 than the protective glass L10. The protective glass L10 for protecting the infrared filter L9 is disposed between the infrared filter L9 and an image plane Im of the optical imaging lens 300 and is closer to the image plane Im than the infrared filter L9.

In order to keep the optical imaging lens 300 in good optical performance and high imaging quality, the optical imaging lens 300 further satisfies:

(1) $-0.5 > F/f1 > -0.7$;

(2) $-0.15 > F/f2 > -0.3$;

(3) $0.4 > F/f3 > 0.2$;

(4) $0.3 > F/f45 > 0.15$; $0.15 > F/f4 > 0.05$; $-0.01 > F/f5 > -0.03$;

(5) $0.15 > F/f67 > 0.002$; $-0.10 > F/f6 > -0.20$; $0.6 > F/f7 > 0.4$;

(6) $0.3 > F/f8 > 0.15$;

wherein F is a focal length of the optical imaging lens 300; f1 is a focal length of the first lens L1 of the first optical assembly C1; f2 is a focal length of the second lens L2 of the second optical assembly C2; f3 is a focal length of the third lens L3 of the third optical assembly C3; f4 is a focal length of the fourth lens L4 of the fourth optical assembly C4; f5 is a focal length of the fifth lens L5 of the fourth optical assembly C4; f6 is a focal length of the sixth lens L6 of the fifth optical assembly C5; f7 is a focal length of the seventh lens L7 of the fifth optical assembly C5; f8 is a focal length of the eighth lens L8 of the sixth optical assembly C6; f45 is a focal length of the fourth optical assembly C4; f67 is a focal length of the fifth optical assembly C5.

Parameters of the optical imaging lens 300 of the third embodiment of the present invention are listed in following Table 5, including the focal length F of the optical imaging lens 300 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the fourth optical assembly C4, and the focal length (cemented focal length) of the fifth optical assembly C5, wherein a unit of the focal length, the radius of curvature, and the distance is millimeter (mm).

TABLE 3

F = 3.26 mm; Fno = 2.06; HFOV = 129.94 deg

| Surface | R(mm) | D(mm) | Nd | Focal length | Cemented focal length | Note |
|---|---|---|---|---|---|---|
| S1 | 13.03 | 1.14 | 1.88 | −5.43 | | L1 |
| S2 | 3.46 | 3.75 | 1 | 0 | | |
| S3 | −5.15 | 3.21 | 1.91 | −14.63 | | L2 |

TABLE 3-continued

F = 3.26 mm; Fno = 2.06; HFOV = 129.94 deg

| Surface | R(mm) | D(mm) | Nd | Focal length | Cemented focal length | Note |
|---|---|---|---|---|---|---|
| S4 | −11.86 | 0.14 | 1 | 0 | | |
| S5 | 14.02 | 2.19 | 1.95 | 9.61 | | L3 |
| S6 | −22.12 | 0.09 | 1 | 0 | | |
| ST | Infinity | 0.01 | 1 | | | ST |
| S7 | 7.98 | 1.44 | 1.59 | 31.41 | 14.04 | L4 |
| S8, S9 | −5.06 | 0.72 | 1.81 | −153.61 | | L5 |
| S10 | −20.23 | 0.25 | 1 | | | |
| S11 | 6.88 | 0.87 | 1.95 | −22.32 | 1154.72 | L6 |
| S12, S13 | 4.61 | 2.17 | 1.59 | 6.34 | | L7 |
| S14 | 11.88 | 1.22 | 1 | 0 | | |
| S15 | 11.68 | 1.61 | 1.5 | 15.07 | | L8 |
| S16 | −21.09 | 0.3 | 1 | | | |
| S17 | Infinity | 0.3 | 1.52 | | | Infrared filter L9 |
| S18 | Infinity | 2 | 1 | | | |
| S19 | Infinity | 0.5 | 1.52 | | | Protective glass L10 |
| S20 | Infinity | 1 | 1 | | | |
| Im | Infinity | 0 | 1 | | | Im |

It can be seen from Table 5 that, in the current embodiment, the focal length F of the optical imaging lens 300 is 3.26 mm, and the Fno is 2.06, and the HFOV is 129.94 degrees, wherein f1=−5.43 mm; f2=−14.63 mm; f3=9.61 mm; f4=31.41 mm; f5=−153.61 mm; f6=−22.32 mm; f7=6.34 mm; f8=15.07 mm; f45=14.04 mm; f67=1154.72 mm.

Additionally, based on the above detailed parameters, detailed values of the aforementioned conditional formula in the second embodiment are as follows: F/f1=−0.6; F/f2=−0.22; F/f3=0.34; F/f45=0.23; F/f4=0.1; F/f5=−0.02; F/f67=0.0028; F/f6=−0.15; F/f7=0.51; F/f8=0.22.

With the aforementioned design, the first optical assembly C1 to the sixth optical assembly C6 satisfy the aforementioned conditions (1) to (6) of the optical imaging lens 300.

Moreover, an aspheric surface contour shape Z of each of the object-side surface S15 of the eighth lens L8, and the image-side surface S16 of the eighth lens L8 of the optical imaging lens 300 according to the third embodiment could be obtained by following formula:

$$Z = \frac{ch^2}{1 + \sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S15 of the eighth lens L8, and the image-side surface S16 of the eighth lens L8 of the optical imaging lens 300 according to the third embodiment and the different order coefficient of A2, A4, A6, A8, A10, A12, A14, and A16 are listed in following Table 6:

TABLE 4

| Surface | S15 | S16 |
|---|---|---|
| k | 3.67E+00 | 3.65E+01 |
| A2 | 0 | 0 |

TABLE 4-continued

| Surface | S15 | S16 |
|---|---|---|
| A4 | −3.49E−03 | 1.35E−03 |
| A6 | 2.24E−04 | −2.59E−04 |
| A8 | −4.09E−05 | 7.57E−05 |
| A10 | 2.83E−06 | −8.37E−06 |
| A12 | 3.57E−09 | 4.51E−07 |
| A14 | 0 | 0 |
| A16 | 0 | 0 |

Figure 3B:
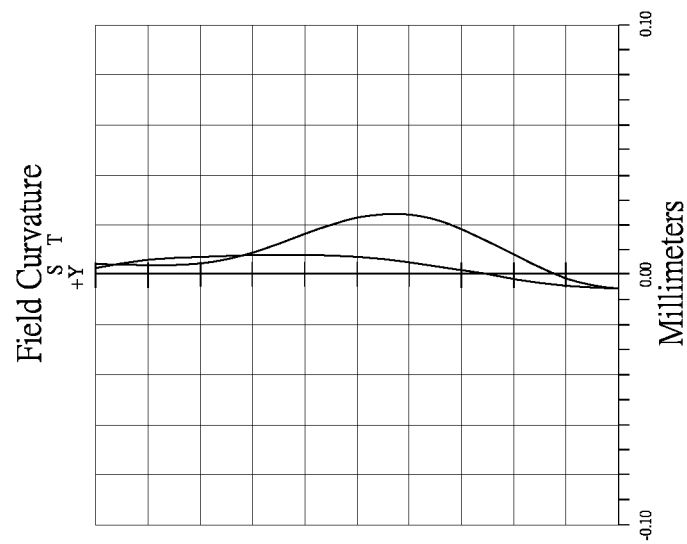
FIG. 3B is a diagram showing the astigmatic field curvature of the optical imaging lens according to the third embodiment of the present invention.
Figure 3C:
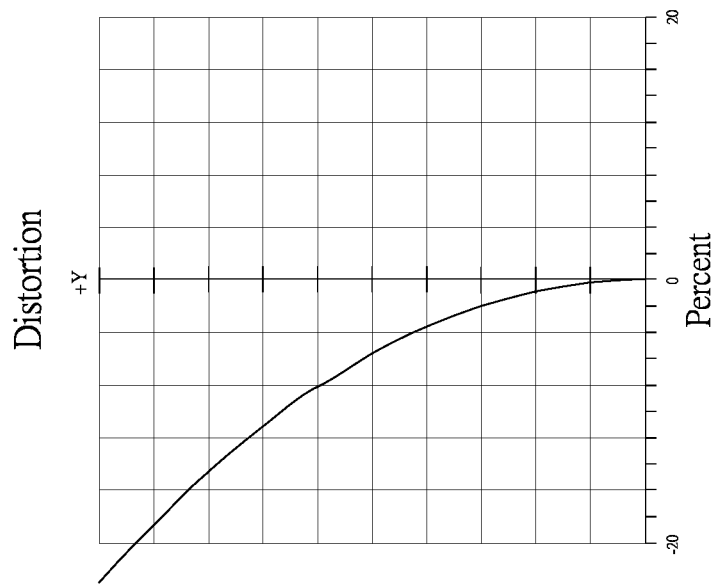
FIG. 3C is a diagram showing the distortion of the optical imaging lens according to the third embodiment of the present invention.
Figure 3D:
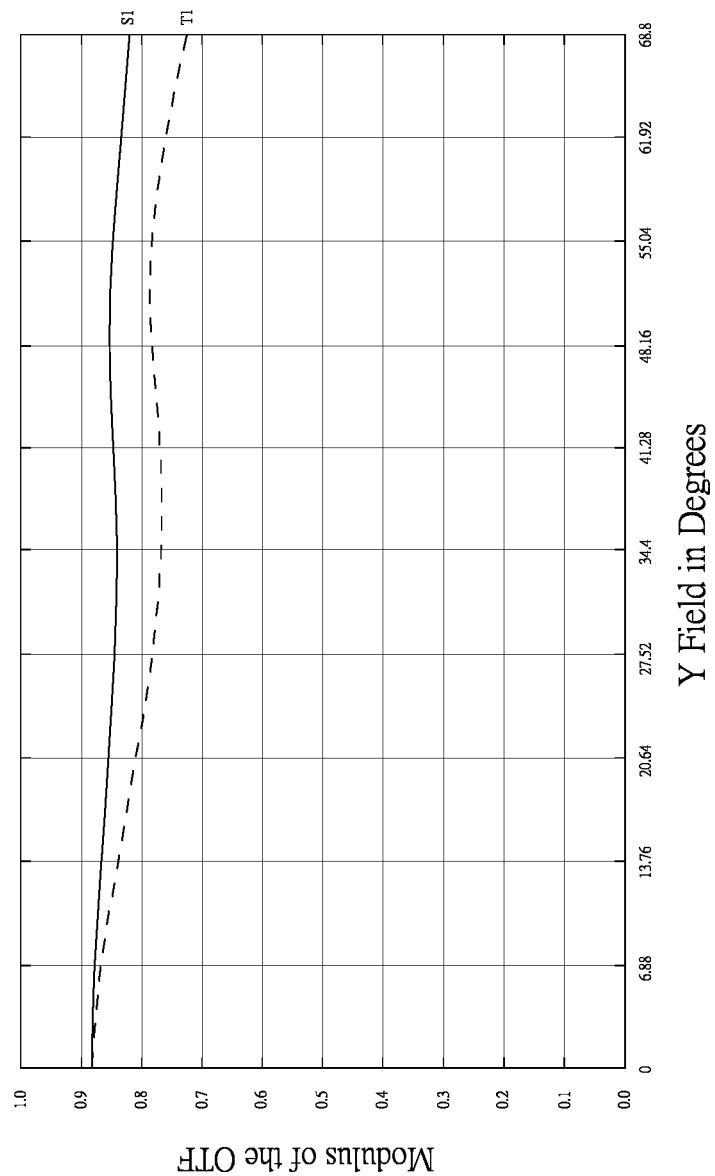
FIG. 3D is a diagram showing the modulus of the OTF of the optical imaging lens according to the third embodiment of the present invention.

Taking optical simulation data to verify the imaging quality of the optical imaging lens 300, wherein FIG. 3B a diagram showing the astigmatic field curves according to the third embodiment; FIG. 3C is a diagram showing the distortion according to the third embodiment; FIG. 3D is a diagram showing the modulus of the OTF according to the third embodiment. In FIG. 3B, a curve S is data of a sagittal direction, and a curve T is data of a tangential direction. The graphics shown in FIG. 3C and FIG. 3D are within a standard range. In this way, the optical imaging lens 300 of the third embodiment could effectively enhance image quality and lower a distortion thereof and could also meet the imaging requirement of visible light during the day and infrared light at night.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, the optical imaging lens consists of eight lenses with refractive power, comprising:
   a first optical assembly having negative refractive power;
   a second optical assembly having negative refractive power;
   a third optical assembly having positive refractive power;
   an aperture;
   a fourth optical assembly having positive refractive power;
   a fifth optical assembly having positive refractive power;

a sixth optical assembly having positive refractive power;
wherein two of the first optical assembly, the second optical assembly, the third optical assembly, the fourth optical assembly, the fifth optical assembly, and the sixth optical assembly comprise a compound lens formed by adhering at least two lenses, while the others are single lens; wherein the first optical assembly is a single lens that comprises a first lens; the second optical assembly is a single lens that comprises a second lens, wherein an image-side surface of the second lens is a convex surface; the third optical assembly is a single lens that comprises a third lens; the fourth optical assembly is a compound lens that comprises a fourth lens and a fifth lens; the fifth optical assembly is a compound lens that comprises a sixth lens and a seventh lens; the sixth optical assembly is a single lens that comprises an eighth lens, wherein an image-side surface of the eighth lens is a convex surface, and
wherein the optical imaging lens satisfies: $0.15 > F/f67 > 0.002$, wherein F is a focal length of the optical imaging lens; f67 is a focal length of the fifth optical assembly.

2. The optical imaging lens as claimed in claim 1, wherein the optical imaging lens satisfies: $-0.5 > F/f1 > -0.7$, wherein F is a focal length of the optical imaging lens; f1 is a focal length of the first lens.

3. The optical imaging lens as claimed in claim 1, wherein the optical imaging lens satisfies: $-0.15 > F/f2 > -0.3$, wherein F is a focal length of the optical imaging lens; f2 is a focal length of the second lens.

4. The optical imaging lens as claimed in claim 1, wherein the optical imaging lens satisfies: $0.4 > F/f3 > 0.2$, wherein F is a focal length of the optical imaging lens; f3 is a focal length of the third lens.

5. The optical imaging lens as claimed in claim 1, wherein the optical imaging lens satisfies: $0.3 > F/f45 > 0.15$, wherein F is a focal length of the optical imaging lens; f45 is a focal length of the fourth optical assembly.

6. The optical imaging lens as claimed in claim 5, wherein the optical imaging lens satisfies: $0.15 > F/f4 > 0.05$, wherein f4 is a focal length of the fourth lens.

7. The optical imaging lens as claimed in claim 5, wherein the optical imaging lens satisfies: $-0.01 > F/f5 > -0.03$, wherein f5 is a focal length of the fifth lens.

8. The optical imaging lens as claimed in claim 1, wherein the optical imaging lens satisfies: $-0.10 > F/f6 > -0.20$, wherein F is the focal length of the optical imaging lens; f6 is a focal length of the sixth lens.

9. The optical imaging lens as claimed in claim 1, wherein the optical imaging lens satisfies: $0.6 > F/f7 > 0.4$, wherein F is the focal length of the optical imaging lens; f7 is a focal length of the seventh lens.

10. The optical imaging lens as claimed in claim 1, wherein the optical imaging lens satisfies: $0.3 > F/f8 > 0.15$, wherein F is a focal length of the optical imaging lens; f8 is a focal length of the eighth lens.

11. An optical imaging lens, in order from an object side to an image side along an optical axis, the optical imaging lens consists of eight lenses with refractive power, comprising:
a first lens having negative refractive power, wherein an object-side surface of the first lens is a convex surface, and an image-side surface of the first lens is a concave surface;
a second lens having negative refractive power, wherein an object-side surface of the second lens is a concave surface, and an image-side surface of the second lens is a convex surface;
a third lens, which is a biconvex lens with positive refractive power;
an aperture;
a fourth lens having positive refractive power;
a fifth lens having negative refractive power;
a sixth lens having negative refractive power;
a seventh lens having positive refractive power; and
an eighth lens, which is a biconvex lens with positive refractive power, wherein both of the object-side surface and the image-side surface of the eighth lens are aspheric surfaces.

12. The optical imaging lens as claimed in claim 11, wherein the fourth lens is a biconvex lens; an object-side surface of the fifth lens is a concave surface, and an image-side surface of the fifth lens is a convex surface; an image-side surface of the fourth lens and the object-side surface of the fifth lens are adhered to form a compound lens with positive refractive power.

13. The optical imaging lens as claimed in claim 11, wherein an object-side surface of the sixth lens is a convex surface, and an image-side surface of the sixth lens is a concave surface; an object-side surface of the seventh lens is a convex surface, and an image-side surface of the seventh lens is a concave surface; the image-side surface of the sixth lens and the object-side surface of the seventh lens are adhered to form a compound lens with positive refractive power.

14. The optical imaging lens as claimed in claim 13, wherein the optical imaging lens satisfies: $0.15 > F/f67 > 0.002$, wherein F is a focal length of the optical imaging lens; f67 is a focal length of the compound lens formed by adhering the sixth lens and the seventh lens.

15. The optical imaging lens as claimed in claim 11, wherein the optical imaging lens satisfies: $-0.5 > F/f1 > -0.7$, wherein F is a focal length of the optical imaging lens; f1 is a focal length of the first lens.

16. The optical imaging lens as claimed in claim 11, wherein the optical imaging lens satisfies: $-0.15 > F/f2 > -0.3$, wherein F is a focal length of the optical imaging lens; f2 is a focal length of the second lens.

17. The optical imaging lens as claimed in claim 11, wherein the optical imaging lens satisfies: $0.4 > F/f3 > 0.2$, wherein F is a focal length of the optical imaging lens; f3 is a focal length of the third lens.

18. The optical imaging lens as claimed in claim 11, wherein the optical imaging lens satisfies: $0.3 > F/f45 > 0.15$, wherein F is a focal length of the optical imaging lens; f45 is a focal length of the compound lens formed by adhering the fourth lens and the fifth lens.

19. The optical imaging lens as claimed in claim 11, wherein the optical imaging lens satisfies: $0.15 > F/f4 > 0.05$, wherein F is a focal length of the optical imaging lens; f4 is a focal length of the fourth lens.

20. The optical imaging lens as claimed in claim 11, wherein the optical imaging lens satisfies: $-0.10 > F/f6 > -0.20$, wherein F is a focal length of the optical imaging lens; f6 is a focal length of the sixth lens.

21. The optical imaging lens as claimed in claim 11, wherein the optical imaging lens satisfies: $0.6 > F/f7 > 0.4$, wherein F is a focal length of the optical imaging lens; f7 is a focal length of the seventh lens.

22. The optical imaging lens as claimed in claim 11, wherein the optical imaging lens satisfies: $0.3 > F/f8 > 0.15$, wherein F is a focal length of the optical imaging lens; f8 is a focal length of the eighth lens.

23. An optical imaging lens, in order from an object side to an image side along an optical axis, the optical imaging lens consists of eight lenses with refractive power, comprising:
- a first lens having negative refractive power, wherein an object-side surface of the first lens is a convex surface, and an image-side surface of the first lens is a concave surface;
- a second lens having negative refractive power, wherein an object-side surface of the second lens is a concave surface, and an image-side surface of the second lens is a convex surface;
- a third lens, which is a biconvex lens with positive refractive power;
- an aperture;
- a fourth lens having positive refractive power;
- a fifth lens having negative refractive power;
- a sixth lens having negative refractive power;
- a seventh lens having positive refractive power; and
- an eighth lens, which is a biconvex lens with positive refractive power, wherein the optical imaging lens satisfies: $-0.01 > F/f5 > -0.03$, wherein F is a focal length of the optical imaging lens; f5 is a focal length of the fifth lens.

* * * * *